(12) United States Patent
Nguyen (10) Patent No.: US 6,937,331 B1
(45) Date of Patent: Aug. 30, 2005

(54) HIGH-SPEED ELECTROMECHANICAL SHUTTER FOR IMAGING SPECTROGRAPHS

(75) Inventor: Quang-Viet Nguyen, Richmond Heights, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 323 days.

(21) Appl. No.: 10/356,932

(22) Filed: Jan. 30, 2003

(51) Int. Cl.[7] ............................. G01J 3/40; G01B 26/04
(52) U.S. Cl. ....................................... 356/305; 359/235
(58) Field of Search ....................... 356/305; 359/235; 352/215, 218; 348/368; 250/231.15; 396/501

(56) References Cited

U.S. PATENT DOCUMENTS

| | | | |
|---|---|---|---|
| 3,938,365 A | 2/1976 | Dewey, Jr. | |
| 3,950,084 A | 4/1976 | Reinsch | |
| 4,083,626 A | 4/1978 | Miyahara et al. | |
| 4,257,693 A | 3/1981 | Hirata et al. | |
| 4,410,787 A | 10/1983 | Kremers et al. | |
| 4,504,866 A | 3/1985 | Saito | |
| 4,571,629 A | 2/1986 | Horio et al. | |
| 4,699,483 A * | 10/1987 | Swinehart | 352/216 |
| 4,743,108 A | 5/1988 | Vogel et al. | |
| 4,856,897 A | 8/1989 | Fateley et al. | |
| 4,917,478 A * | 4/1990 | Petran et al. | 359/235 |
| 4,961,207 A | 10/1990 | Wittmer et al. | |
| 5,137,346 A | 8/1992 | Sattler et al. | |
| 5,457,530 A | 10/1995 | Nagai | |
| 5,539,488 A | 7/1996 | Erickson et al. | |
| 5,760,950 A * | 6/1998 | Maly et al. | 359/368 |
| 5,920,739 A | 7/1999 | Piper et al. | |
| 5,969,846 A * | 10/1999 | Kishi | 359/235 |
| 6,035,148 A | 3/2000 | Jehan | |
| 6,472,657 B1 * | 10/2002 | Miles et al. | 250/231.15 |

* cited by examiner

*Primary Examiner*—F. L. Evans
*Assistant Examiner*—Kara Geisel
(74) *Attorney, Agent, or Firm*—Kent N. Stone; Laura Shunk (57) ABSTRACT

The present invention presents a high-speed electromechanical shutter which has at least two rotary beam choppers that are synchronized using a phase-locked loop electronic control to reduce the duty cycle. These choppers have blade means that can comprise discs or drums, each having about 60 (+/−15) slots which are from about 0.3 to about 0.8 mm wide and about 5 to about 20 mm long (radially) which are evenly distributed through out 360°, and a third rotary chopper which is optically aligned has a small number of slots, such as for example, 1 to 10 slots which are about 1 to about 2 mm wide and about 5 to about 20 mm long (radially). Further the blade means include phase slots that allow the blade means to be phase locked using a closed loop control circuit. In addition, in a preferred embodiment, the system also has a leaf shutter. Thus the invention preferably achieves a gate width of less than about 100 microseconds, using motors that operate at 3000 to 10,000 rpm, and with a phase jitter of less than about 1.5 microseconds, and further using an aperture with more than about 75% optical transmission with a clear aperture of about 0.8 mm×10 mm. The system can be synchronized to external sources at 0 6 kHz lasers, data acquisition systems, and cameras.

29 Claims, 12 Drawing Sheets

HIGH-SPEED ELECTROMECHANICAL SHUTTER FOR IMAGING SPECTROGRAPHS

The invention relates generally to high-speed shutter mechanisms, and in particular, to high-speed shutter mechanisms which can be used to enhance the use of spectrometers by diminishing background light. The current invention provides an ultra high speed shutter in which multiple shutter mechanisms are electronically coupled using phase locked loop electronic control so as avoid the use of ultra high speed motors or complicated gearing mechanisms. This solution to the issue of high speed gating achieves a repetition rate ranging from 1 Hz to 6 kHz, which is ideal for use with a pulsed laser having typical repetition rates within this range, such as a 10 Hz Nd:YAG laser. The system can achieve a gate width of about 20 microseconds or less with an accuracy of +/−1.5 µs (phase jitter). The system is simple, and mechanically robust, easy to align, and relatively safe and easy to use.

BACKGROUND OF THE INVENTION

Sophisticated analytical techniques of the present day include the use of various modes of spectroscopy that involve excitation of a sample and subsequent observation and/or quantification or the resultant changes in energy as manifested by spectral emissions. These modifications to the energy of the sample can be induced using focused electro-magnetic energy emissions at a predetermined wavelength, or even using electro-magnetic radiation. Thus, a spectrograph typically includes an external source of electromagnetic energy and means to disperse the energy into its energy components. A detection system is used to measure and/or record the dispersed energy components. The current invention is helpful in allowing the observation of such emissions as it reduces the amount of incident electromagnetic energy onto the detection means by rejecting the undesirable non-synchronous background electromagnetic energy otherwise known as noise and/or background interference. This effectively increases the relative strength of the desired signal or spectrum.

The present invention more precisely relates to the use of an extremely weak light signal from pulsed optical techniques, such as spontaneous Raman scattering (SRS), to measure gas-phase molecular densities and temperatures in combustion environments. However, this use in particular often suffers from large sources of background interference such as flame and soot luminosity that are substantially brighter than the faint amounts of signals derived form the weak Raman effect. Time gating the amount of light reaching the detector can improve the signal to noise ratio (SNR) for techniques such as SRS, and laser induced fluorescence (LIF) and other low energy laser driven techniques.

The prior art has recognized that damping background light can alleviate this problem. One approach presented in U.S. Pat. No. 4,956,897 is to use a liquid crystal array along with Hadamard encodement as a stationary electro-optical mask. Other prior art techniques utilize liquid crystal display ("LCD") shutters without the Hadamard mask. Further, a photo-multiplier tube has been used as a gated integrator for a single channel detector in conjunction with a spectrograph. Image intensifiers have also been employed as an optical gate for use with pulsed laser excitation sources for multi-channel detection in spectrograph. Problems encountered with some of these prior art techniques include low quantum efficiency, decreased signal to noise ratio (SNR), and a low dynamic range of about $10^2$, or $10^3$ at best. In order to provide higher quantum efficiency, higher SNR and more dynamic range, it has been proposed to use non-image intensified charge-coupled devices (CCD's) for the detection of weak pulsed light signals. However, non-intensified CCD's do not have the ability to gate-out background light interference on the time scale of the laser pulse resulting in large background signal levels. Typically, large format leaf shutters are used with non-intensified CCD arrays to reduce levels of background. However, typical test shutters have minimum gate widths of about 10 ms. In a 10 ms time period, substantial levels of background light overwhelms the signal from the Raman effect which is in the range of 100 to 10,000 photo-electrons for a typical SRS measurement.

Another prior art response to these problems have included attempts to gate non-intensified CCD's using ferroelectric light controllers (FLC), and have provided gate widths as short as 35 µs (microseconds), but with a relatively low (i.e. 25%) optical transmission efficiency in the on-state and typically a 500:1 contrast ratio. The use of FLC's however, was only marginally better than the use of intensified CCD's due to the FLC's reduced optical efficiency and wider temporal gate width. Other techniques in the prior art include the use of slit scanning optics to limit the transmission and to block incidental background light. One such technique is set forth in U.S. Pat. No. 5,457,530 which utilizes an optical shutter array member having a slit plate made of a piezoelectric material such as PZT (lead zirconium titanate). Another technique using a rotary chopper with a mechanically geared motor was developed by R. S. Barlow and P. C. Miles, "A shutter-based line imaging system for single-shot Raman scattering measurements of gradients in mixture fraction", Proceedings of the $28^{th}$ International Symposium on Combustion, Edinburgh, Scotland (2000). This system utilized geared high-speed (21,000 rpm) rotary chopper blades. However, these prior art techniques suffer from being complex and difficult to build and maintain at the desired speed of operation.

In addition, the current invention is useful for devices that produce short pulses of light from continuous wave light sources such as a stroboscope or a high repetition rate laser source. It is useful as a fiber optic light gate at microsecond speeds. It is also useful as a high-speed molecular beam shutter used in high-vacuum systems.

SUMMARY AND OBJECTS OF THE INVENTION

The present invention involves the use of at least two rotary beam choppers that are synchronized using a phase-locked loop electronic control to reduce the duty cycle. More preferably, these choppers can comprise two counter rotating disk choppers each having about 60 (+/−15) slots which are from about 0.3 to about 0.8 mm wide and about 5 to about 20 mm long (radially) which are evenly distributed throughout 360°, and a third disk shutter in the optical line has a small number of slots, such as for example, 1 to 10 and more preferably about 2 to 4 slots which are about 1 to about 2 mm wide and about 5 to about 20 mm long (radially). The optical slots overlap and further, the discs include phase slots that allow the discs to be phase locked using a closed loop control circuit. In addition, in a preferred embodiment, the system also has a leaf shutter. Thus the invention preferably achieves a gate width of less than about 100 microseconds, and more particularly about 50 microseconds, and most particularly about 30 or even 10 microseconds using motors that operate at 3000 to 10,000 rpm, and with a phase jitter of less than about +/−15 microseconds, or more particularly about 1.5 or 1 microsecond, and further using an aperture with more than about 75%, and preferably more than about 80%, and most preferably more than about 85% or more optical transmission in the on state with a clear aperture of about 0.8 mm×10 mm, and with 0% transmission in the off state.

It is an object of the invention to provide a clear aperture of at least 0.5 mm×10 mm which is the typical entrance slit on spectrographs and good optical throughput or transmission with excellent imaging capability.

It is another object of the invention to provide a robust design that is easy to use and requires minimal maintenance. This is achieved by electronically coupling the chopper blades so as to avoid complex, and potentially troublesome mechanical coupling mechanisms. Further, it is another object of the invention to use relatively low speed (i.e. 4,000 to 8,000, and preferably about 6,000 rpm) motors that are commercially available as off the shelf items. This helps to meet another object of the invention of avoiding issues with dynamic balance and vibration and other safety concerns related to the use of high speed rotating equipment.

It is another object of the invention to provide an optical gate width of the order of 15 $\mu$s with less than 1.5 $\mu$s phase jitter.

Finally it is an object of the invention to have the ability to phase-lock the shutter system to an external reference frequency, i.e. $f_2$, the final output frequency, which frequency is provided by external means such as a function generator or the experiment itself ranging from 0 Hz to 100 Hz, and up to 6 kHz. This permits the shutter to be synchronized with flash lamp pumped dye laser (1 Hz), flash lamp pumped Q-switched Nd:YAG lasers (10–50 Hz), excimer lasers (100–300 Hz), and CW pumped Q-switched Nd:YAG lasers (1000–6000 Hz). The motor sensor could be an opto-electronic sensor or an electromagnetic sensor, such as a Hall effect sensor or some other non-contact electronic sensing technique.

BRIEF DESCRIPTION OF THE DRAWINGS

FIG. 12a is a side view of the outer circular rotary blade of the fourth embodiment of the invention utilizing a drum configuration for the chopper blades;

FIG. 12b is a top schematic view of the embodiment shown in FIG. 12a;

DETAILED DESCRIPTION OF THE INVENTION

Figure 1:
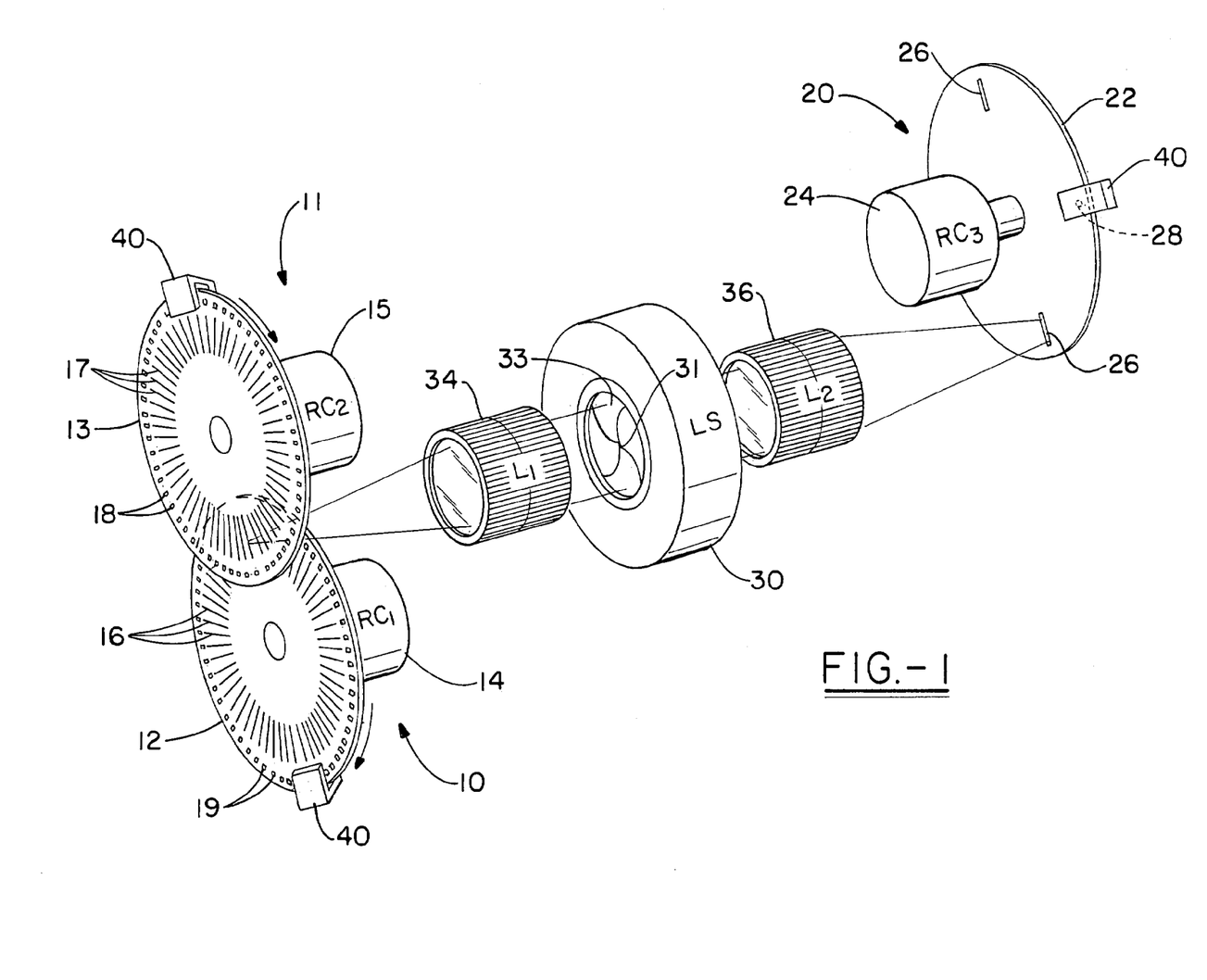
FIG. 1 is a perspective view from the top and side of the high-speed rotary shutter system in accordance with a first embodiment of the invention.
Figure 2:
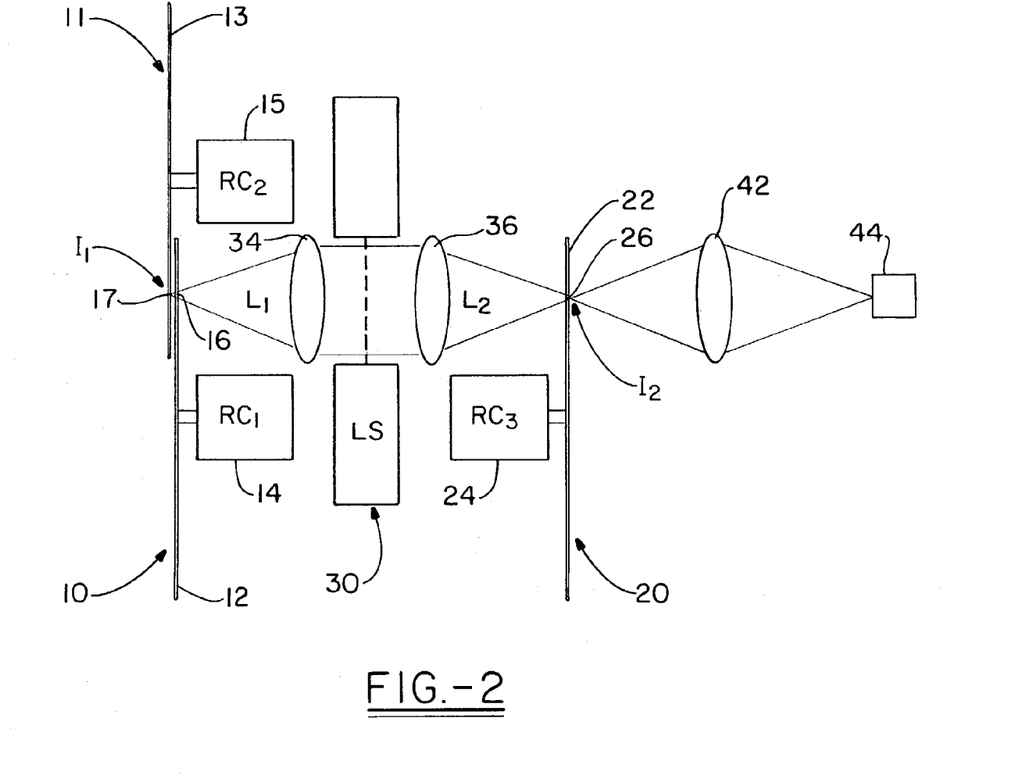
FIG. 2 is a schematic of the high-speed rotary shutter system shown in FIG. 1.

The high speed electromechanical shutter in accordance with the present invention is shown generally in FIG. 1 and shown as a schematic in FIG. 2. The invention uses a set of three low speed (i.e. about 6,000 RPM) electronically phase-locked rotary choppers in conjunction with a conventional reciprocating shutter, such as a leaf or blade shutter, or even a oscillating shutter, such as a butterfly shutter. By using solid state electronics to gear the choppers together, the choppers act in synchronism with a number of benefits: the motors are available as off the shelf items, the invention eliminates complex and unreliable mechanical gearing, and the speed of the motors is relatively benign.

The invention comprises a set of rotary choppers including a first 10 and a second 11 rotary chopper each having rotary blade or disc 12, 13, respectively coupled to its own motor 14, 15 and each having a plurality of peripheral optical slots 16, 17 and a corresponding plurality of phase slots 18, 19. In addition, a third rotary chopper 20 has a rotary blade 22 and its own motor 24 and a more limited number (i.e. from about 5 to 1, but illustrated as 2) of peripheral optical slots 26 and corresponding phase slots 28. The chopper blades 12, 13 and 22 each have peripheral optical slots or transmission gates that allow optical transmission for a defined period of time. Thus, it should be understood that the optical slots could be openings, or could consist of a transparent substance so that the blade could either be cut, or could also be a transparent material that has a coating that acts as an optical mask so as to define the slots. Each chopper has a respective phase sensor 40 that works in conjunction with the phase slots to enable the blades to be in an electronic phase lock loop. These sensors can be an opto-electronic interrupter.

The first and second rotary choppers, 10, 11 are aligned with parallel axes of rotation and positioned so that the peripheral optical slots 16, 17 of the blades are optically aligned to allow an image to pass through both chopper blades in a time controlled manner. More specifically, the faces overlap so that the peripheral slots of the second chopper blade and the third chopper blade come into periodic optical alignment, i.e. the slots, or optical gates rotate past each other to cause an optical pathway to be opened and then be closed in synchronicity with the temporal alignment of the opposing slots. Preferably, both of the blades rotate in the same direction so that one slot will pass upwardly and the corresponding slot will pass downwardly if the axis of rotation is parallel to the ground. The direction of rotation, i.e. clockwise or counterclockwise is arbitrary, so that either direction can be selected.

The third rotary blade 22 is aligned (i.e. has a parallel axis of rotation) with both of the first and second rotary choppers 10, 11 and in one embodiment has a concentric axis of rotation with the first rotary blade. A leaf shutter 30 having multiple leaf shutter blades 33 which open to define an optical opening 31, is preferably located between the set of overlapping rotary choppers 10, 11, and the third rotary chopper 20. Of course other methods could be used to achieve the same effect as the leaf shutter. Basically this device functions to block a large diameter beam of light at a gate width of approximately about 5 to about 10 milliseconds in an electronically controllable manner as may best be seen in the schematic shown in FIG. 2. Other similar "blocking devices" could include a solenoid actuated obscuration blade, a Venetian blind style shutter or LCD optical gating.

In addition, the invention includes a first and a second relay lens 34, 36, which can be multi-element camera lens. A main image collection lens relays the image $I_1$ to the set of rotary choppers through the first and second relay lenses 34, 36 through the third rotary chopper 20 through a final relay image lens 42 to relay the slit image $I_2$ to the detector 44.

The invention is based on a relationship between distance and time (speed) which calculates the temporal gate width T [s] of a rotary shutter gating a stationary collimated beam of light of a diameter s [mm], passing through a rotating aperture of width s, located at a radius R [mm] from the center of a wheel, spinning at a frequency of ω [Hz], and can be expressed by the equation:

$$T = s/(2\pi\omega R) \qquad (1)$$

For example, if one desired a 30 microsecond optical gate period for an aperture of 0.762 mm (which is the diameter of a standard tool bit), and a conventional rotary chopper wheel blade and motor are used (ω=100 Hz and R=40 mm), Eq. (1) indicates that a minimum gate width of about 30.3 μs is possible. This gate width can be reduced in half without having to increase the rotational frequency of the choppers by using two phase locked counter-rotating shutter blades. Thus, a 15.2 microsecond gate width can be achieved using reliable, off the shelf chopper motors and controllers by using "phase locked loop" ("PLL") electronics to "gear" one chopper blade to another.

A high repetition rate is desired for the primary set of chopper blades in order to simplify the alignment of the light beam through such a rapidly spinning narrow aperture. In addition to permitting the optical path to be aligned at any point along the many apertures on the chopper wheel, the high repetition frequency of the primary blades also provides a higher level of phase stability and permits high-resolution adjustment of the relative phase angle (delay) between the two chopper blades. Conventional rotary choppers systems typically have a limit of about 60 slots which provide an upper primary shutter frequency of 6000 Hz. Most mega-pixel imaging CCD arrays cannot be read-out at such a high frequency. Furthermore, most pulsed laser excitation sources for the experiments operate at a typical rate of 10 Hz. It is therefore preferred in accordance with the present invention, to reduce the 6000 Hz rate provided by such conventional commercially available rotary chopper systems to a much lower rate.

This may be accomplished using a multi-step duty cycle reduction process. A preferred embodiment of this process is demonstrated in the timing diagram of FIG. 3. In this figure, there is a representation of a series of optical transmission functions for the different shutters used. The traces 50 labeled $RC_1$ and $RC_2$ refer to the primary pair of high-speed rotary choppers 10, 11 which generate the high repetition rate $f_0$ (6000 Hz). The $RC_3$ trace 52 shows the transmission function of a third chopper 20 operating at a frequency $f_1$ (100 Hz), an integral number of $f_0$ obtained by digital division. The LS trace represents the transmission function of a relatively slow leaf shutter 30 operating at a frequency $f_2$ (10 Hz). It is within the scope of the invention to use other frequencies. However, the 100 Hz and 10 Hz values are preferred in so far as these values are compatible with the laser used and the CCD camera systems (which operates at 10 Hz), and with the minimum gate width of the leaf shutter (8 ms). An 8 ms gate width translates to a maximum $RC_3$ frequency $f_1$ of 125 Hz. 100 Hz was selected for convenience, as it is an integral of 6000 Hz and an even multiple 10 Hz. It should be understood however that the invention contemplates the use of other frequencies, with preferred values being in the range of about 50 to about 500 Hz, and preferably from about 75 to about 200 Hz, and most preferably from about 75 to about 125 Hz for $f_1$ and $f_2$ being a suitable integral, such as $\frac{1}{10}^{th}$ of the $f_1$ value, although again as an example, the fraction can vary between $\frac{1}{20}^{th}$ and $\frac{1}{5}$th. Again, it is desired in order to simplify the jobs of electronically coupling the various individual shutter systems that frequencies are selected that are multiples of each other. $RC_3$ is a digital division of $RC_1$, in order to maintain phase, this means that $RC_3$ is an integral such that $f_2$ is in the accepted range of the leaf shutter, i.e. it is within the operating frequency. At the operating frequencies that were selected, i.e. conventional 6000 RPM systems, the first and second chopper blades had 60 optical slots with a width of 0.762 mm×10 mm. The blade had a 40 mm radius to the inner end of the slots and a 114 mm diameter. The blade also had 60 phase slots radially aligned with each of the optical slots. The third chopper blade had two 1.5×10 mm optical slots at 180° and 90° from a pair of similarly spaced phase slots. The blades also include a center hole and radiused slots for mounting.

Figure 3:
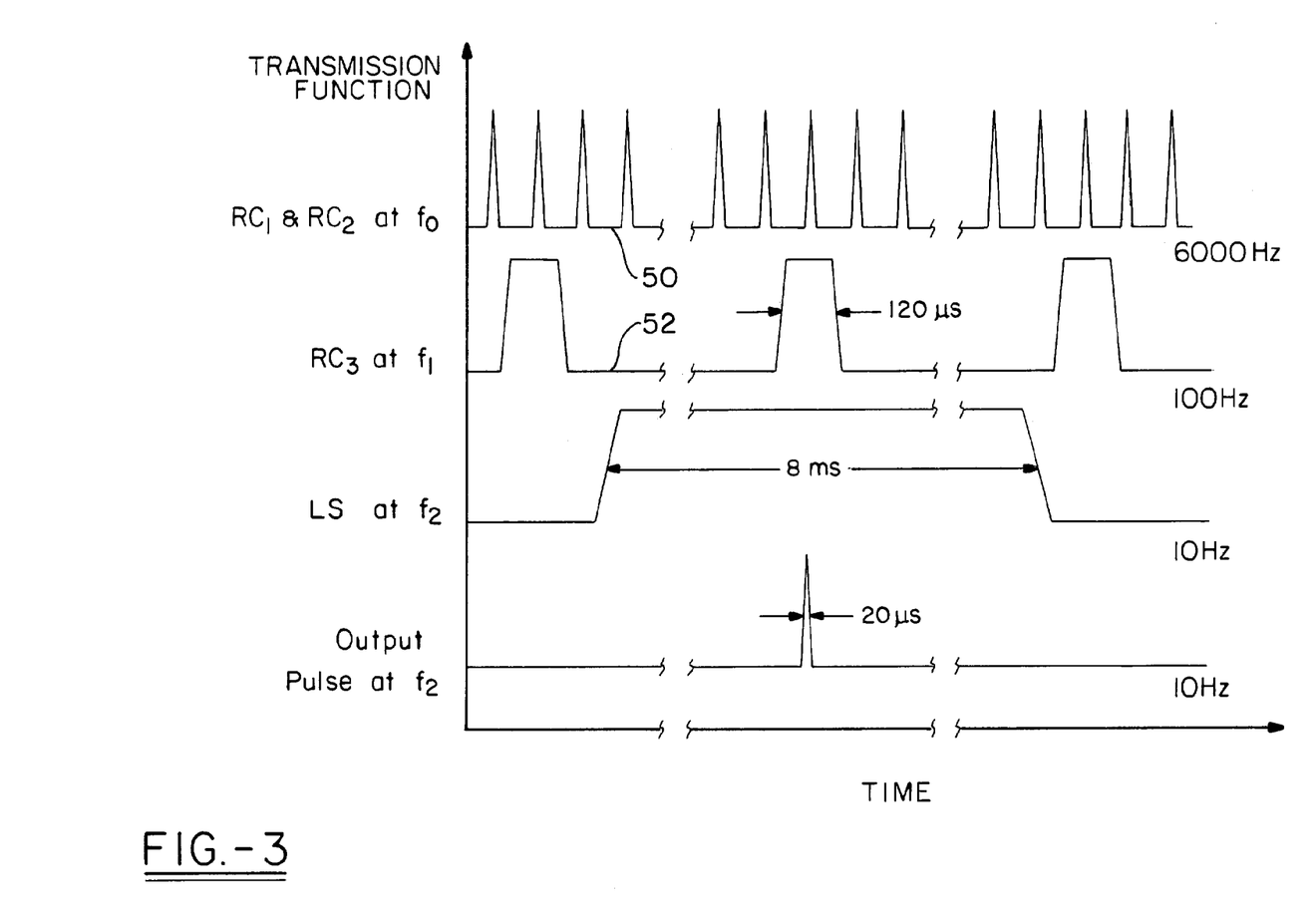
FIG. 3 is a timing diagram of a high-speed rotary shutter system.
Figure 4A:
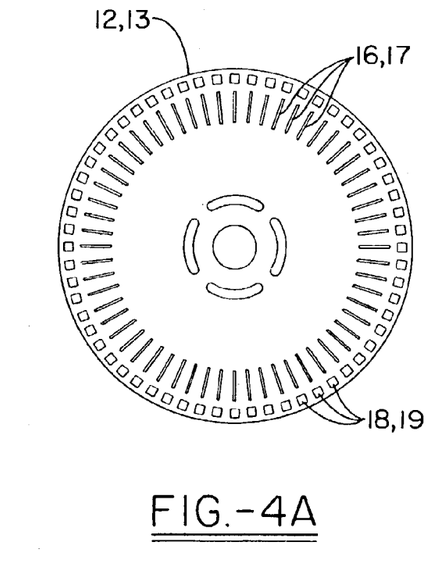
FIG. 4 is a schematic of the shutter blade design for use with the high-speed rotary shutter of the present invention.
Figure 4B:
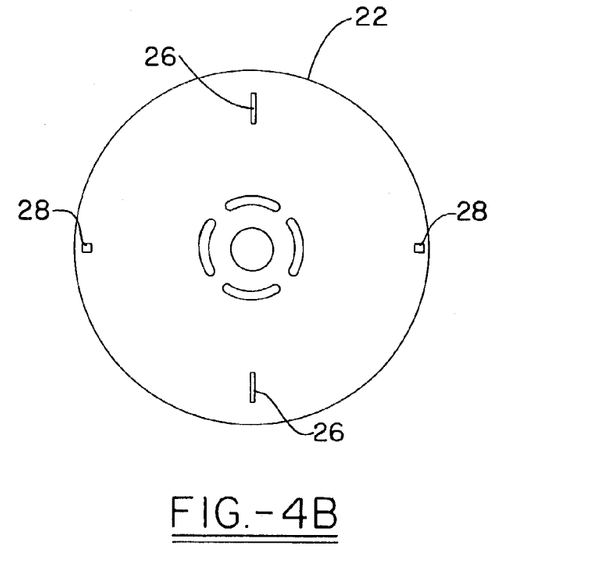

The slot width of $RC_3$ is determined by the period between two consecutive pulses from the primary choppers. A 6000 Hz frequency gives a 167 μs gate width. This gate width may be reduced to a smaller values using a 1.5 mm slot width on $RC_3$ to prevent the possibility of pulse overlap, while permitting some tolerance for phase or noise jitter (i.e. the uncertainty or noise in how well synchronized two waveforms such as square-edged pulses) are in time or frequency (phase) space. Thus, the preferred embodiment of the invention provides 3 different phase-locked synchronization signals at 3 digitally divided frequencies: 6000 Hz, 100 Hz, and 10 Hz. The relative phase delays (i.e., the relative delay between the respective phases of the light pulses) between each set of synchronization pulses can be adjusted by either the phase delay control in the chopper motor systems or by a digital time delay in the synchronization pulses themselves.

FIG. 2 is a schematic of the high-speed electromechanical shutter of a primary embodiment of the present invention. As illustrated, the shutter acts as a combination image relay lens/shutter combination. However, the invention also contemplates the elimination of the additional relays lens combination. If sufficiently thin chopper blades are used all three rotary chopper blades can be placed close together to eliminate the additional relay lens combination. A spectrograph may be located at either end of the system with its entrance slit located at the image planes, $I_1$ or $I_2$.

For the purposes of testing the performance of this shutter system, the spectrograph was replaced by another set of relay lenses, which focused the image formed at $I_2$ onto an amplified Si photodiode (not shown). FIG. 1 represents a drawing of the shutter system of the invention with the additional lenses used for imaging the source onto the primary chopper blades and the lenses used to subsequently relay the image to the Si photodiode detector.

The performance of the shutter system was tested by imaging the diffused light output from a 635 nm diode laser onto the primary rotary chopper blades $RC_1$ and $RC_2$ located at $I_1$ with an 85 mm f/1.4 lens. The magnification of the primary collection lens was adjusted so that the imaged spot was equal to the aperture width of the chopper blade at $I_1$. The image formed at $I_1$ is relayed to $I_2$ using a pair of back-to-back 25 mm f/1.3 C-mount lenses ($L_1$ and $L_2$). In between the relay lenses, a 25 mm diameter aperture electromechanical leaf shutter modulates the light at the final output frequency $f_2$.

Figure 5:
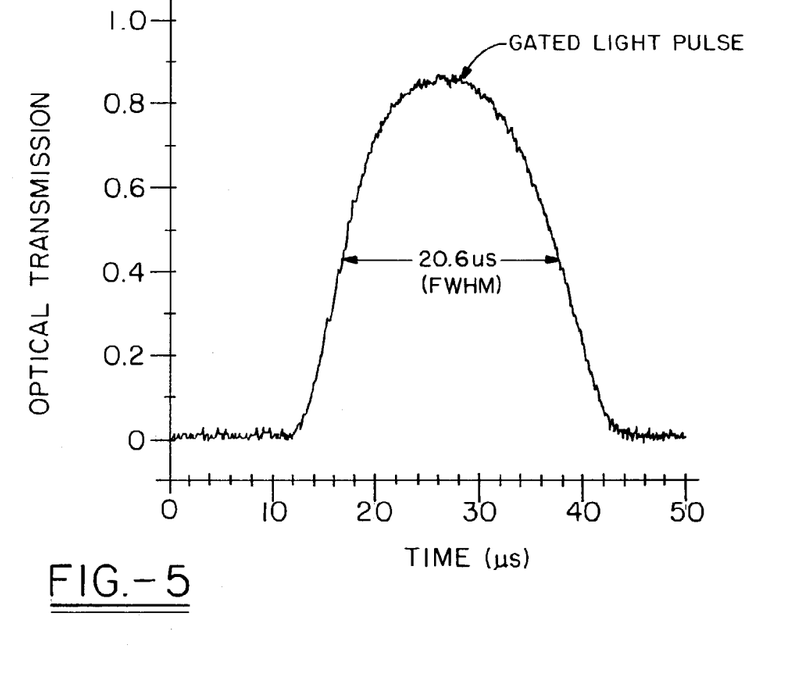
FIG. 5 is a plot of the measured optical transmission through the high-speed rotary shutter system as shown in FIGS. 1 and 2.

FIG. 5 represents the measured optical transmission through the high-speed shutter system of the present invention. The single-pulse optical gate width is 20.6 $\mu$s (FWHM). Gated light pulses were generated at 10 Hz with a +/−0.35 $\mu$s phase jitter relative to a synchronization waveform.

Figure 6:
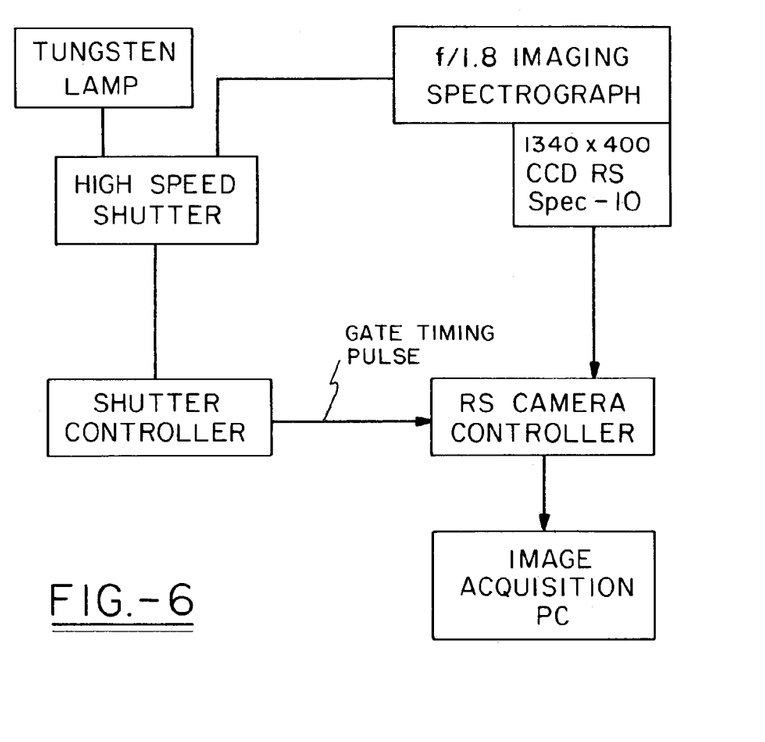
FIG. 6 is a schematic of the experimental set-up used to evaluate the high-speed rotary shutter system of the present invention.

FIG. 6 shows an experimental setup with fiber coupling used to demonstrate the temporal gating performance of the shutter system. It was found that the 12 mm×0.4 mm shutter could be used in an imaging mode to utilize the full slit imaging capability of both the spectrograph and the camera.

Figure 7:
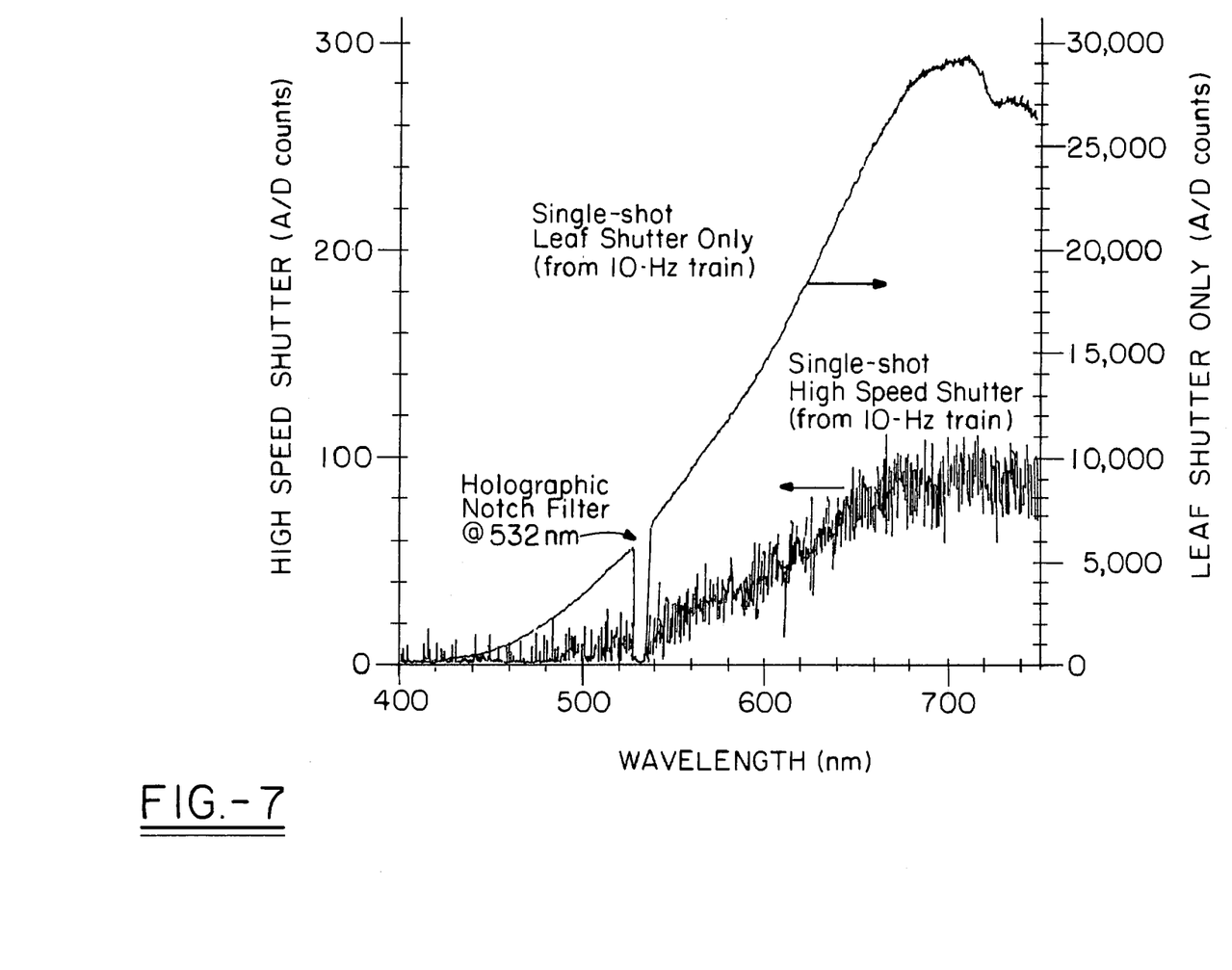
FIG. 7 is a plot of sample date showing the performance of the high-speed rotary shutter of the present invention.

FIG. 7 shows data taken with a backside illuminated CCD and holographic f/1.8 spectrograph with 532 nm prefilter. The data shows a plot of signal with the high-speed shutter (A/D Counts) and of the signal with the leaf shutter only (A/D Counts). The CW Emission was produced using a Calibrated Tungsten filament lamp coupled via a 200 $\mu$m fiber. Using the high speed shutter at a 10 Hz repetition rate, the background simulated by the tungsten lamp emission was reduced to only 0.33% of that without the high-speed shutter.

Figure 8:
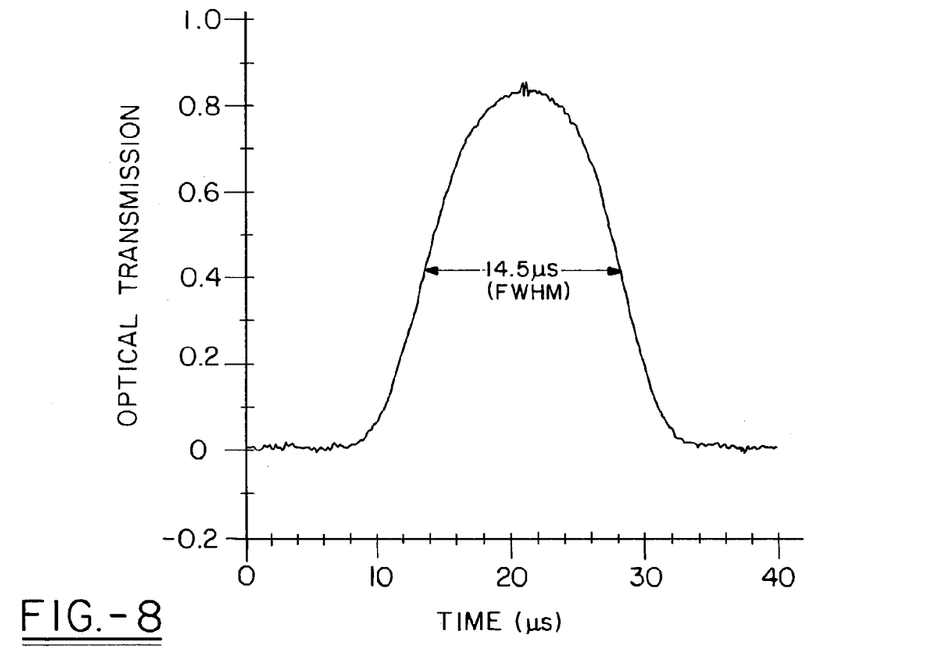
FIG. 8 is a plot of data showing the temporal gate performance of the high-speed rotary shutter system of the present invention.

FIG. 8 shows data taken using a fiber coupled 635 nm diode laser source (in non-lasing LED mode) with an amplified Si photodiode detector (fiber coupled). The plot of optical transmission versus time shows a 14.5 $\mu$s gate (FWHM) for a single shot time trace at 83% max transmission with 10 Hz pulses and a 1.5 $\mu$s jitter (p—p). The plot shows that an 83% optical throughput is achieved with an infinite rejection in the off state. The shutter is able to synchronize to a 10 Hz repetition rate with a 1.5 $\mu$s timing jitter. The optical transmission function shown is a convolution of a triangle gate function with a circular beam profile that is conical (f/1.4) in the z-axis. This results in both a broadening of the theoretical 8.4 $\mu$s gate width and a slight curvature in the transmission function.

Figure 9:
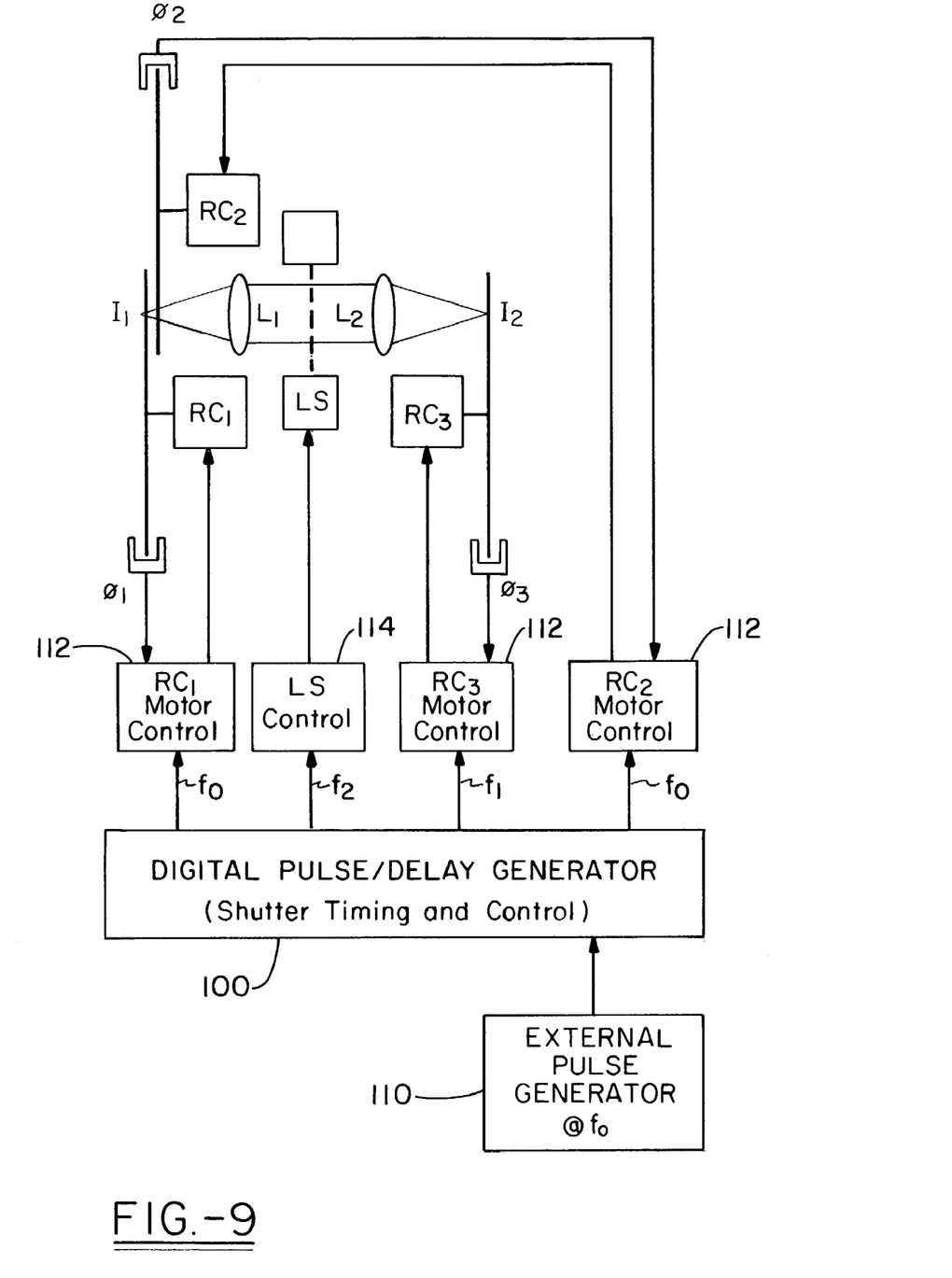
FIG. 9 is a block diagram of the electronic interconnects of the present invention.

FIG. 9 is a block diagram of the electrical interconnects for the high-speed shutter of the present invention where a four channel digital pulse/delay generator 100 serves as the shutter timing and control device and is driven by an external pulse generator 110 at $f_0$ that sets the repetition frequency for the light gating, for example, $f_0$=10 Hz. This number is determined by experimental requirement. The digital pulse delay generator 100 produces $f_1$ and $f_2$ based on a digital frequency division. These frequencies are fed to the motor controls 112 for the first and second rotary chopper motors, to the motor control 113 for the third rotary chopper motor and to the shutter control 114 for the leaf shutter motor. Phase sensors (FIG. 1), which are typically optoelectric interrupter circuits, are located at the edge of the rotary chopper blades and monitor the rotational speed of the chopper blades so that the motor controllers use phase-locked loop (PLL) circuitry.

Figure 10:
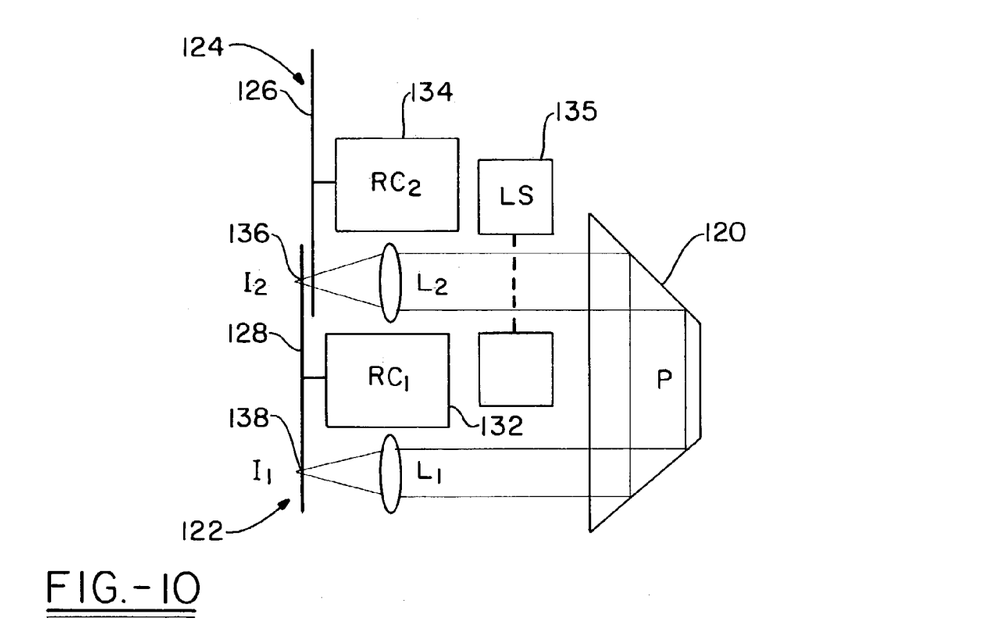
FIG. 10 is a second embodiment of the high-speed rotary shutter system of the present invention utilizing a first folded path.

FIG. 10 is a schematic representation of an alternate embodiment of the high-speed shutter of the present invention. This embodiment utilizes a prism 120 to achieve a folded optical path that allows one of the rotary choppers 122 to function twice on the beam. The blade 126 of the second rotary chopper 124 overlaps the blade 128 of the first rotary chopper 122 as in the first embodiment. Both choppers, 122 and 124, are driven by chopper motors 132 and 134 respectively. Specifically, the prism 120 serves to fold the beam path by 180° to relay the image, $I_1$ to $I_2$ on opposite sides of the same chopper blade mounted on the chopper motor 132. The rotary chopper motor 132 simultaneously chops the beam in place of the first and second chopper motors in the first embodiment. The prism 120 could be replaced with two plane mirrors to yield the same effect but requiring more manual adjustment. A leaf shutter 135 is still required to bring the duty cycle down below the duty cycle imposed by the second chopper motor 134.

This embodiment allows the automatic phase coupling of the peripheral slots 136 and 138 of the chopper blade 128. It also eliminates a chopper motor and changes the space requirements for the total system. In addition, it permits easy fiber optic coupling by placing two fiber optic cable ends at the image plane locations, $I_1$, and $I_2$. In fact, the data presented in FIGS. 7 and 8 were obtained by fiber coupling the inputs and outputs of the optical setup shown in this arrangement.

Figure 11A:
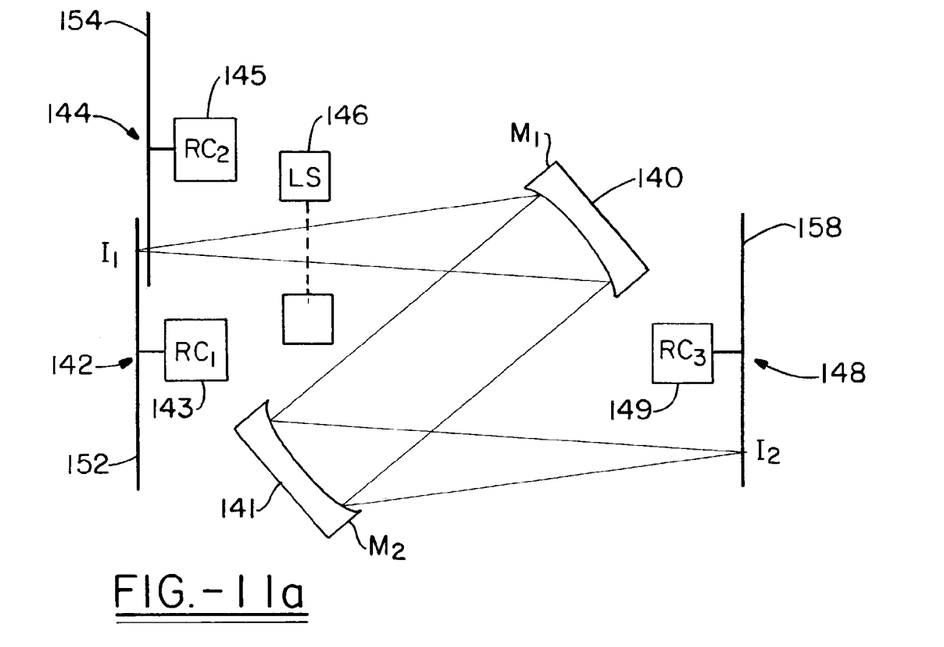
FIG. 11a is a third embodiment of the high-speed rotary shutter system of the present invention utilizing two concave mirrors to achieve a second folded path.
Figure 11B:
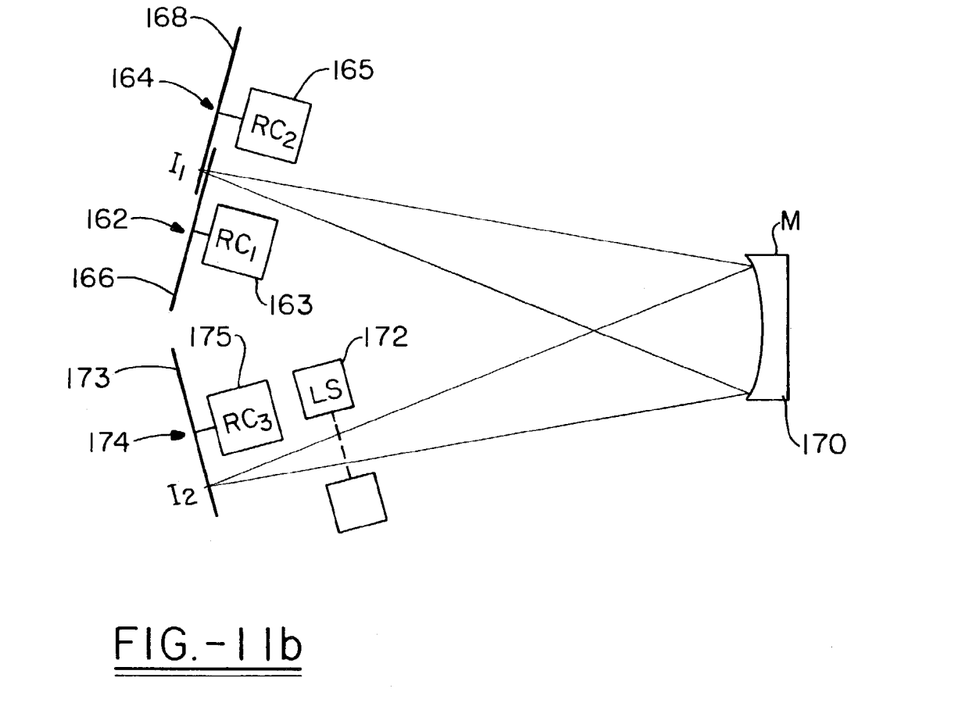
FIG. 11b is a variation of the third embodiment of the high-speed rotary shutter system of the present invention utilizing one concave mirror to achieve a different folded path.
Figure 11C:
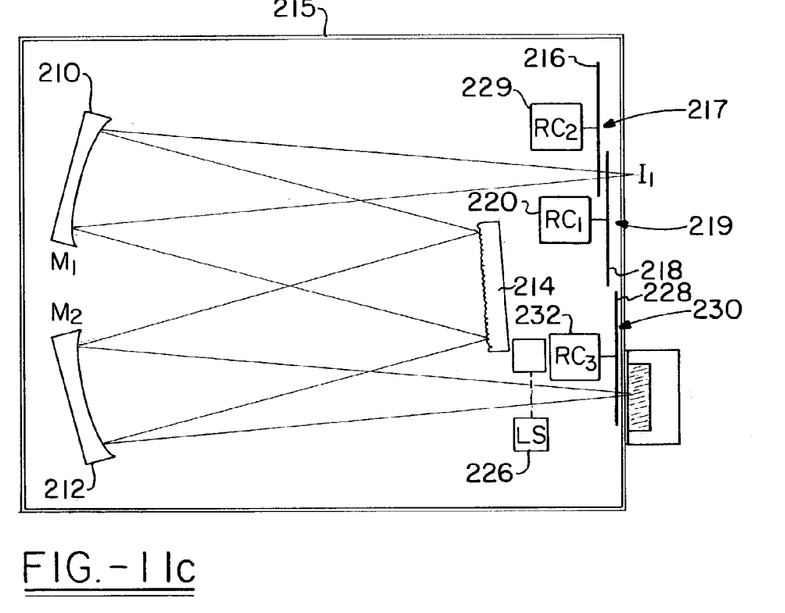
FIG. 11c is a variation of the third embodiment of the high-speed rotary shutter system of the present invention utilizing two concave mirrors and a grating to achieve yet another folded path.

FIGS. 11a, 11b and 11c represent embodiments that utilize concave mirrors in order to fold the path of the beam. In the first of these embodiments shown in 11a, two mirrors 140, 141 are aligned to reflect so as to create a Z-fold beam path that is located between the first and second choppers 142, 144, each having their own chopper motors 143, 145 and having overlapping chopper blades 152 154 having a configuration as for the first embodiment. The leaf shutter 146 is still used between the first pair of choppers and the third chopper 148 having a chopper blade 158 configured as for the first embodiment, which is driven by its own motor 149. The beam path begins with the first image, $I_1$, which is acted upon by the pair of choppers 142, 144, then by the leaf shutter 146 (which is as has been previously described), through the mirrors 140, 141 and then through the third chopper 148 to create a new image, $I_2$.

In the embodiment shown in 11b, a single concave mirror 170 is used to form a V-fold beam path beginning with the first image, $I_1$, that is acted on by a pair of choppers 162, 164 having overlapping chopper blades 166, 168 driven by chopper motors 163, 165 with the mirror 170 at the base of the V, and reflecting the beam path through the leaf shutter 172 and then through the blade 173 of a third chopper 174 having a chopper motor 175 to create the image $I_2$. The chopper blades again have the same configuration as the corresponding blades as previously shown. Once again, and as for all the other embodiments, the leaf shutter corresponds to that previously described. In this embodiment, the imaging quality may be compromised as a result of optical aberrations.

The embodiment shown in 11c shows a variation, which can be integrated directly into a spectrograph. In this design, two concave mirrors 210, 212, are used along with an intermediate grating 214 to create a W-fold beam path. The initial image, $I_1$, is introduced from an input image plane into the housing 215, where it is acted on by a pair of overlapping chopper blades 216, 218 of first and second choppers 217, 219, having chopper motors 220. The first mirror 210 reflects the beam path to the grating 214 which reflects the beam path back to the second mirror 212 through a leaf shutter 226 and through the blade 228 of the third chopper 230 driven by chopper motor 232. The final image is received on the image plane by a CCD detector array. The leaf shutter and chopper blades are substantially similar, if not identical to those previously discussed. All of these embodiments preferably include the same control mechanism including phase locked loop control as mentioned for the first embodiment. This embodiment is intended for a standard Czerny-Turner spectrograph configuration with an integrated high speed shutter system.

Figure 11D:
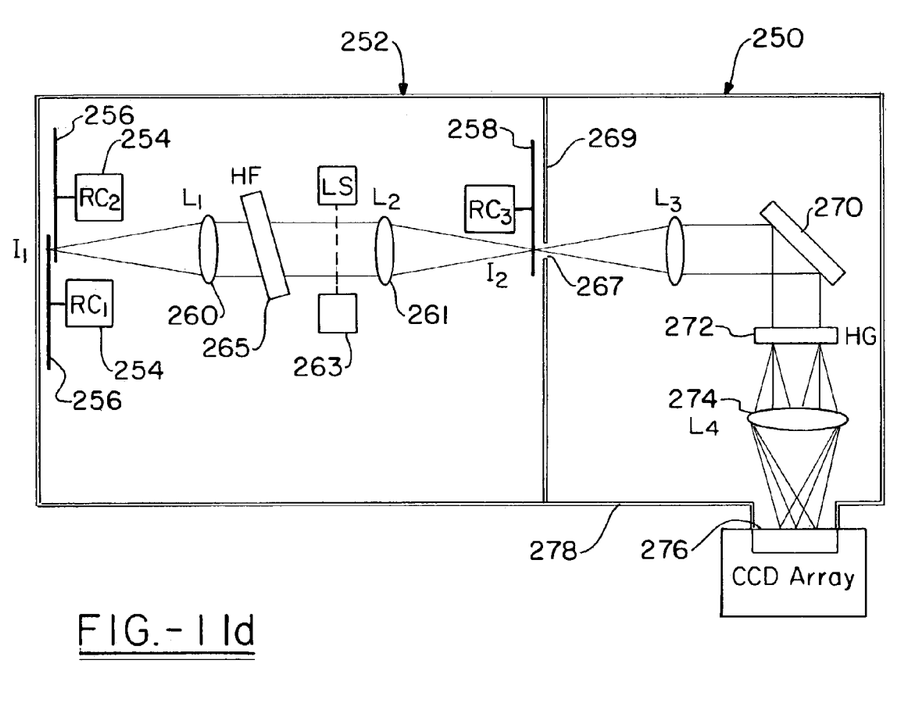
FIG. 11d is yet another variation of the third embodiment of the invention utilizing an axially transmissive holographic grating spectrograph with a holographic prefilter and which is integrated with the high-speed shutter system.

FIG. 11d is set up for after market application to a spectrograph, which is in particular an axially transmissive holographic grating spectrograph 250 joined to a pre-filter section 252 with a high-speed shutter in accordance with the present invention. The configuration is similar to that of the first embodiment with a set of choppers 254 having overlapping chopper blades 256 as previously described and a third chopper 258 with a blade configured as previously described. The shutter would include a first and a second lens 260, 261, on either side of a leaf shutter 263. This central area also includes a holographic filter 265. The beam enters as an image, $I_1$, is subjected to the choppers, the holographic filter and the leaf shutter, and leaves the pre-filter section of the housing through a slit 267 in a dividing wall 269, it then travels through a third lens to a mirror 270, is transmitted through a holographic grating 272 to a fourth lens 274 where it is focused on a CCD array 276 upon leaving the spectrograph section which is contained in the same 278 housing as the pre-filter section.

Figures 12A, 12B:
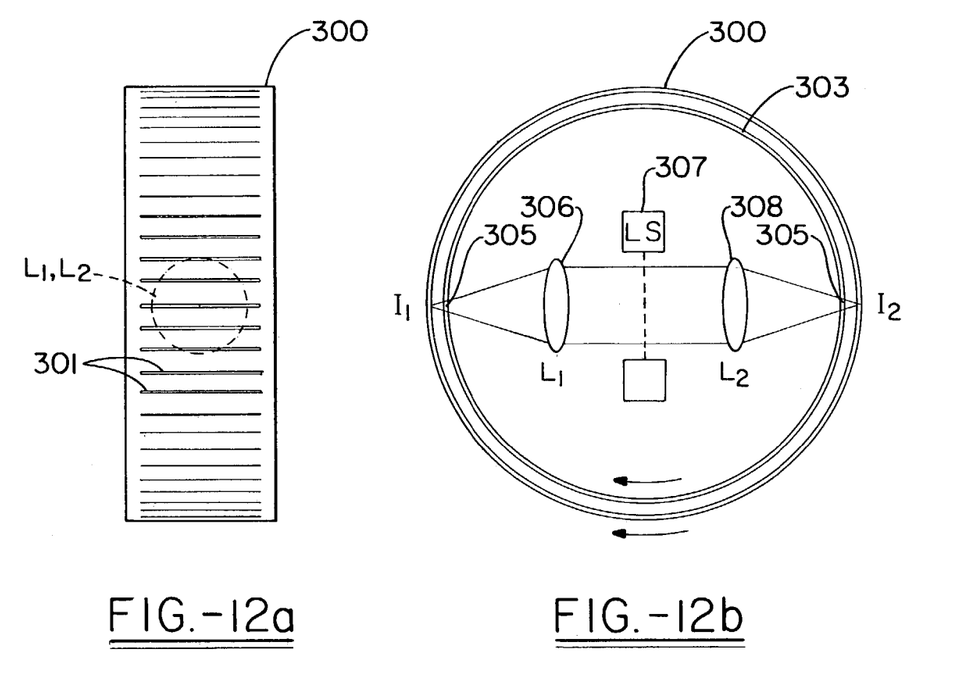

FIGS. 12a and 12b show a different embodiment than those previously described in so far as the high-speed shutter uses a pair of nested "squirrel cages", i.e. a pair of slotted cylindrical rings which are rotated by chopper motors to function in the manner in which the previously described chopper blades function. The outer rotary blade 300 includes 60 evenly spaced slots 301, while the inner blade 303 includes two slots that function in the same manner of the slots in the third rotary blade of the previous embodiments. These two slots 305 are spaced at 180°. The drums are driven by motors (not shown) preferably in the same direction. This direction can be either way. The beam path enters the interior of the inner blade 303 and encounters a first lens 306, a leaf shutter 307 as previously described, and then a second lens 308. It subsequently encounters the opposite side of the blades, and passes through the second set of slots in the blades to form the second image, $I_2$.

Figure 13:
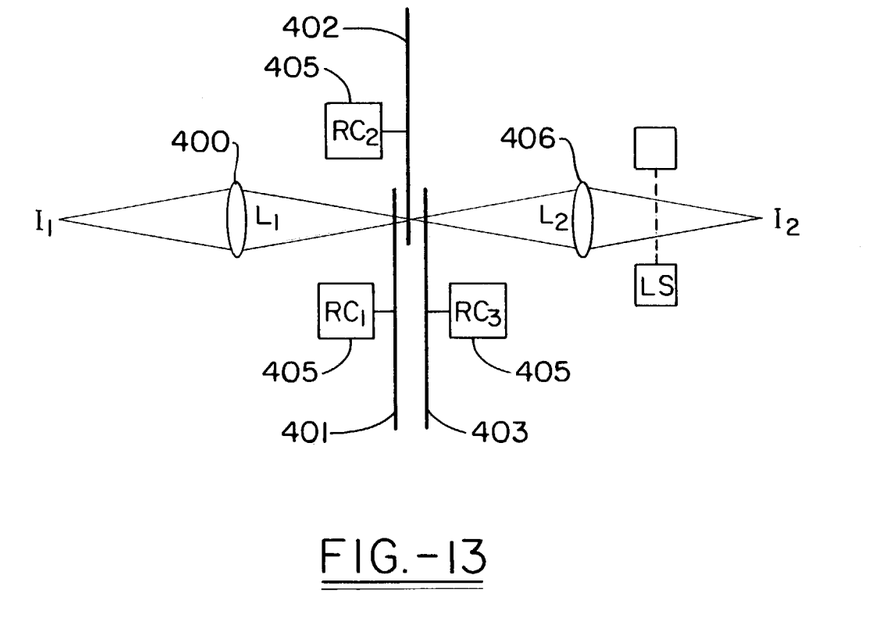
FIG. 13 is a fifth embodiment of the invention having a configuration operating in transmission through transparent blades with an intermediate image plane.

FIG. 13 represents an alternate configuration operating in transmission through transparent blades with an intermediate image plane. In this embodiment, the image, $I_1$, enters a first lens 400, and then is transmitted through a first chopper blade 401 which is a transmissive blade, such as clear glass with a mask so as to define 60 optical openings, or slots. The second chopper blade 402 is similar and also has 60 optical slots or openings. The third chopper blade 403 has only two diametrically opposed slots. The first and third blades 401, 402 sandwich and overlap the second blade 402 in order that the peripheral slots can be aligned. The blades are each driven by their own chopper motors, 405. The beam exits the three choppers and enters a second lens 406, passes through a leaf shutter 407 as previously described, and ends up as the final image, $I_2$.

Figure 14:
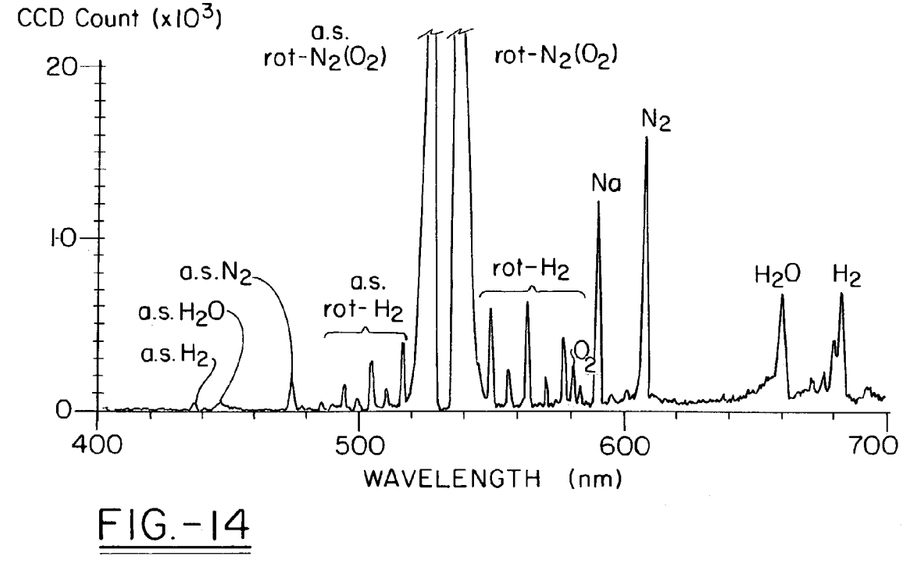
FIG. 14 represents experimentally measured Raman scattering spectrum of combustion products in an $H_2$-Air flame.
Figure 15:
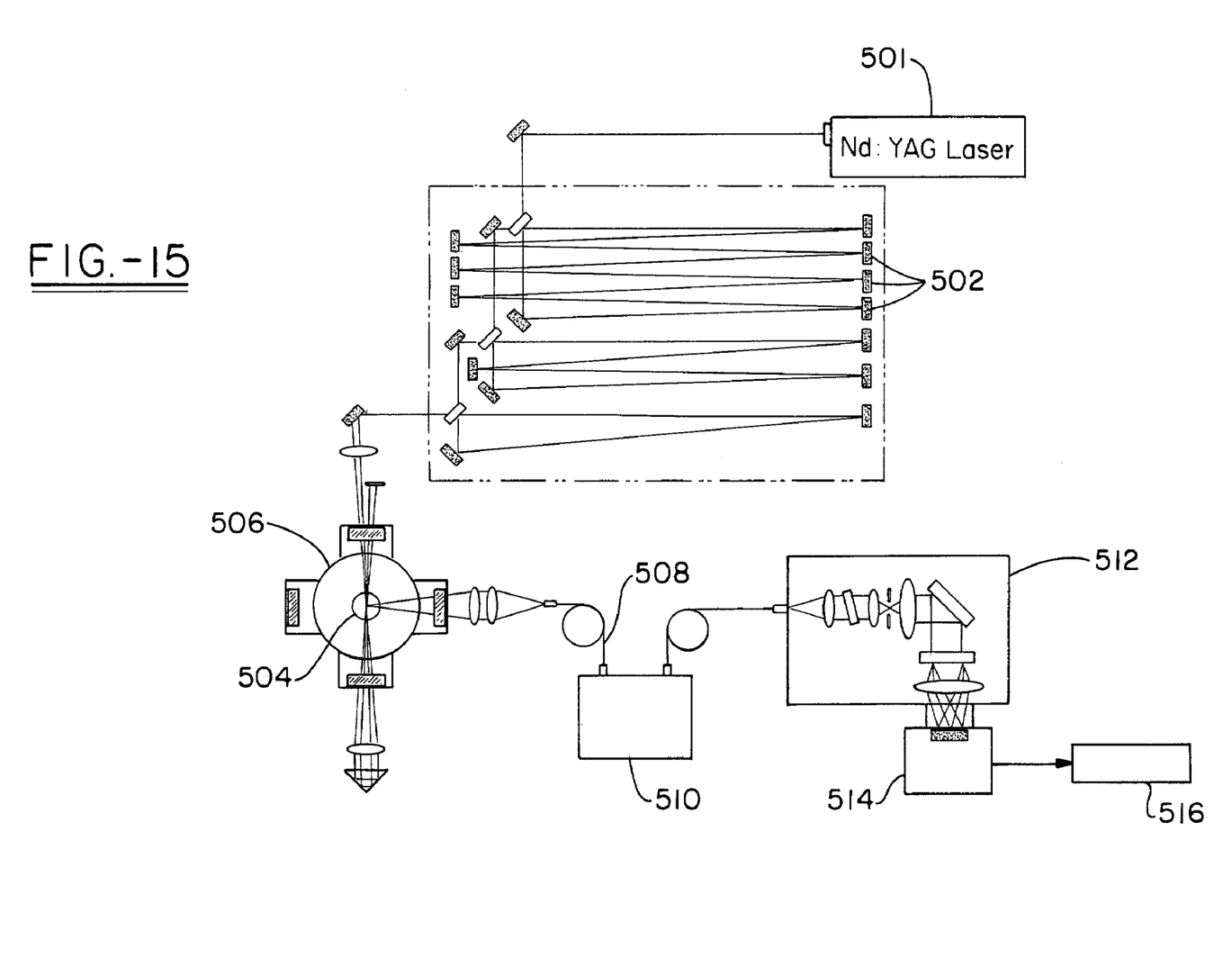
FIG. 15 is an optical set-up for Raman scattering measurements in high pressure flames.

The application of the present invention with a high-performance Raman scattering system has been demonstrated in the context of high speed pressure gaseous fuel combustion studies. In particular, this experiment has involved the development of a high-pressure (up to 60 atm) gaseous burner facility with optical access that provides steady, reproducible flames with high precision, and the ability to use multiple fuel/oxidizer combinations along with a high-performance spontaneous Raman scattering system that utilizes the high speed electromechanical shutter system of the present invention. The burner and Raman scattering system are being used together to acquire and establish a comprehensive Raman scattering spectral database for use as a quantitative high-pressure calibration of single-shot Raman scattering measurements in high-pressure combustion systems. Using these facilities, the Raman spectra of $H_2$-Air flames were successfully measured at pressures up to 20 atm. The optical set-up for the Raman scattering measurements in high pressure flames is shown in FIG. 15. A beam from a Nd:YAG laser 501 is split using a series of mirrors 502 and beam splitters which form a passive optical ring cavity in order to stretch the pulse. The resultant beam is directed through the burner 504 of a high-pressure rig 506, and through a fiber 508 through the high-speed shutter system 510 of the present invention to a holographic spectrograph 512, and finally to a CCD camera 514 where the output is transmitted to a personal computer 516. The spectra demonstrated clear rotational and ro-vibrational Raman features of $H_2$, $N_2$, and $H_2O$. The theoretical Raman spectra of pure rotational $H_2$, vibrational $H_2$, and vibrational $N_2$ were calculated using a classical harmonic-oscillator model with pressure broadening effects and fitted to the data with good correlation. FIG. 14 shows the experimentally measured Raman spectrum of combustion products in a $H_2$-Air flame burning at 20 atm of pressure and at an equivalence ratio of 1.34. The data in FIG. 14 shows an example of the low-background, high SNR data that is possible with the present invention. Note that the Raman scattering signal would be almost impossible to observe without the high speed shutter in the present invention due to the very large levels of background luminosity present in high pressure $H_2$-Air flames. Of particular note, the data in FIG. 15 shows the entire visible Raman spectrum from 400 nm to 800 nm, and permits observing the Stokes (red-shifted) and anti-Stokes (blue-shifted) Raman features for all the major species in the flame ($N_2$, $O_2$, $H_2$, and $H_2O$). At this condition, the theoretically derived gas temperature of 1889 K was obtained from spectrally fitting the data to a comprehensive Raman spectral model of $H_2$ and $N_2$. The model and the data showed good agreement, confirming a ro-vibrational equilibrium temperature and further demonstrating the viability of the present invention for use with gathering and interpreting spectral data.

An injection seeded, Q-switched Nd:YAG laser operating at 532 nm with about 1000 mJ/pulse was used as the excitation laser source for the Raman scattering measurements apparatus. The laser pulse was temporally stretched to 75 ns FWHM using a passive optical ring-cavity system described by J. Kojima and Q. V. Nguyen (Applied Optics, 2002). The pulse stretcher reduces the peak power to approximately 10% of the input peak power so that the laser pulse can be focused into the fine volume without the breakdown of gases as well as without damaging windows. Using a 750 mm focal length lens, the light emerging from pulse stretcher was focused to a approximately 1 mm beam waist at the probe volume. The beam, after passing through the probe volume, was then reflected back into the probe volume using a 400 mm collimating lens and a right-angle prism; this effectively doubled the laser energy in the probe volume.

Figure 16:
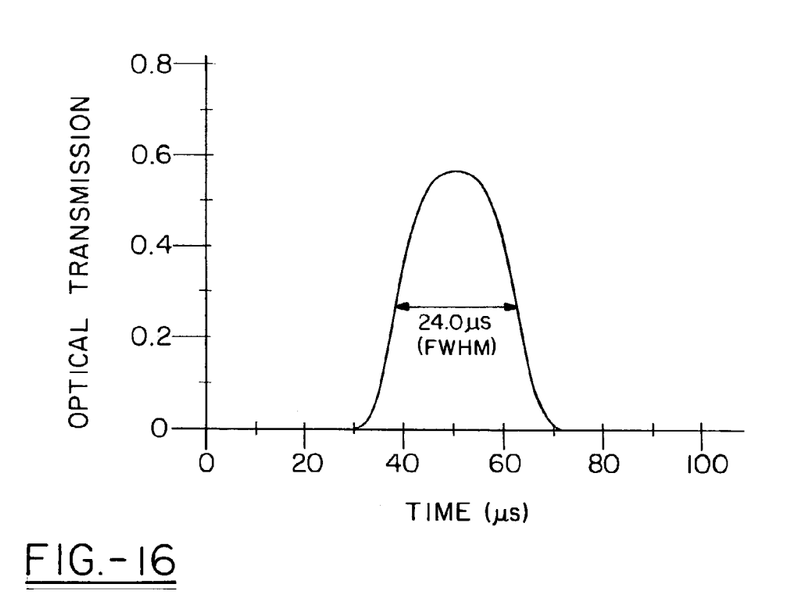
FIG. 16 is a plot of optical transmission through the high speed shutter system of the present invention.

The vertically polarized Raman scattered signal was collected at a 90-degree angle with a multi-element camera lens (85 mm, f/1.4) and was then focused onto a single silica optical fiber (400 $\mu$m in core diameter) connected to the high speed electro-mechanical high-speed shutter of the present invention for gating the light. FIG. 16 shows the optical transmission through the shutter system, which provided 24 $\mu$s exposure (FWHM) with 0.4 $\mu$s jitter with 12×0.762 mm clear aperture to reduce the effects of background light interferences. The gated light from the shutter was directed to the spectrograph. The optical throughput of the shutter system was 55% including fiber transmission losses. The axially transmissive spectrograph (f/1.8) is fitted with a holographic notch filter to attenuate the Rayleigh scattering component of the signal by over six orders of magnitude. A volume holographic transmission grating disperses the signal into different wavelengths which are detected by a non-intensified, thermo-electrically cooled (−45° C.), back-illuminated CCD camera (1340×400 pixels) which provides approximately a 90% quantum efficiency with 16-bits of dynamic range. The electronic exposure of the CCD was 5 ms (but the actual time exposure limited by the shutter is 24 $\mu$s), and the data was binned over 50 vertical pixels and accumulated for 250 shots (on the chip) to increase the signal-to-noise. The Spectral resolution was 1.2 nm for the 100 $\mu$m slit used. The spectral intensity was corrected to irradiance units (W/cm$^2$/nm) by means of the calibration of CCD count with calibration blackbody lamp so that it could be compared with theoretically calculated Raman spectra.

While in accordance with the patent statutes, the best mode and preferred embodiment have been set forth, the scope of the invention is not limited thereto, but rather by the scope of the attached claims.

What is claimed is:

1. A high-speed electro-mechanical shutter comprising:
   at least two rotary choppers each having a motor which operates at 3,000 to 10,000 rpm and which are synchronized using a phase-locked loop electronic control;
   wherein the rotary choppers each comprise a blade means defining a series of transmission apertures which is driven by the motor to cause rotation of the transmission apertures, and wherein the at least two blade means are positioned to cause intermittent synchronous alignment of a first of the transmission apertures of one of the blade means with a second of the transmission apertures of another of the blade means to parse an energy beam that passes through the first and second transmission apertures; and
   wherein the motors drive the respective blade means so that the first and the second aperture travel pass each other in opposite directions; and
   wherein, the blade means comprises a disc or a drum; and
   wherein the blade means comprise a disc and the transmission apertures comprise from about 45 to about 75 evenly distributed slots in the disc, and wherein each slot is about 0.3 to about 0.8 mm wide and about 5 to about 20 mm long; and
   wherein the slots are peripheral; and
   a third rotary chopper having a blade means which includes at least one transmission aperture which is positioned to further parse the energy beam that has passed through the first and the second transmission apertures.

2. A high-speed electro-mechanical shutter as set forth in claim 1 further comprising a reciprocating shutter.

3. A high-speed electro-mechanical shutter as set forth in claim 2 wherein the reciprocating shutter is a leaf shutter.

4. A high-speed electro-mechanical shutter as set forth in claim 1 wherein the blade means of the third rotary chopper has from 1 to about 6 transmission apertures.

5. A high-speed electro-mechanical shutter as set forth in claim 3 wherein the path of the energy beam is linear.

6. A high-speed electro-mechanical shutter as set forth in claim 3 wherein the path of the energy beam is folded.

7. A high-speed electro-mechanical shutter as set forth in claim 6 wherein the path is folded by one or more of a concave mirror and an optical grating.

8. A high-speed electro-mechanical shutter as set forth in claim 3 further including control means and phase sensors and wherein the blade means include phase slots having a position which is monitored by the phase sensors and the phase locked loop control is accomplished by the control of the motors by the electronic control means upon receiving information from the phase sensors.

9. A high-speed electro-mechanical shutter as set forth in claim 8 which achieves a gate width of less than about 100 microseconds.

10. A high-speed electro-mechanical shutter as set forth in claim 9 which achieves a gate width of less than about 50 microseconds.

11. A high-speed electro-mechanical shutter as set forth in claim 8 which achieves a gate width of less than about 30 microseconds.

12. A high-speed electro-mechanical shutter as set forth in claim 8 which achieves a gate width of less than about 10 microseconds.

13. A high-speed electro-mechanical shutter as set forth in claim 8 which achieves a phase jitter of less than about +/−15 microseconds.

14. A high-speed electro-mechanical shutter as set forth in claim 8 which achieves a phase jitter of less than about +/−1.5 microseconds.

15. A high-speed electro-mechanical shutter as set forth in claim 8 which achieves a phase jitter of less than about +/−1 microseconds.

16. A high-speed electromechanical shutter as set forth in claim 14 which receives information from a spectrograph.

17. A high-speed electro-mechanical shutter comprising:
    at least two rotary choppers each having a motor which operates at 3.000 to 10.000 rpm and which are synchronized using a phase-locked loop electronic control;
    wherein the shutter is capable of being phase-locked to an external reference frequency, $f_2$, provided by external means.

18. A high-peed electromechanical shutter as set forth in claim 17 wherein the external reference frequency is from about 0 to about 6 kHz.

19. A high-speed electromechanical shutter as set forth in claim 18 wherein the external reference frequency is from about 0 to about 100 Hz.

20. A high-speed electromechanical shutter as set forth in claim 18 wherein the shutter is capable of being synchronized with one or more of flash lamp pumped dye laser (1 Hz), flash lamp pumped Q-switched Nd:YAG lasers (10–50 Hz), excimer lasers (100–300 Hz and CW pumped Q-switched ND:YAG lasers (1000–6000 Hz).

21. A spectrograph comprising a source of electromagnetic energy, means to disperse the electromagnetic energy into its component energy levels onto a detector having a resultant output, and a means to record the resultant output, and further comprising a spectral intensifier which includes a high-speed electro-mechanical shutter comprising at least two rotary choppers each having a motor which operates at 3,000 to 10,000 rpm and which are synchronized using a phase-locked loop electronic control.

22. A spectrograph as set forth in claim 21 wherein the rotary choppers each comprise a blade means defining a series of transmission apertures which is driven by the motor to cause rotation of the transmission apertures, and wherein the at least two blade means are positioned to cause intermittent synchronous alignment of a first of the transmission apertures of one of the blade means with a second of the transmission apertures of another of the blade means to parse an energy beam that passes through the first and second transmission apertures.

23. A spectrograph as set forth in claim 22 wherein the motors drive the respective blade means so that the first and the second aperture travel pass each other in opposite directions.

24. A spectrograph as set forth in claim 23 wherein the blade means comprises a disc or a drum.

25. A spectrograph as set forth in claim 24 wherein the transmission apertures comprises a series of slots.

26. A spectrograph as set forth in claim 25 further comprising a third rotary chopper having a blade means which includes at least one transmission aperture which is positioned to further parse the energy beam that has passed through the first and the second transmission apertures.

27. A spectrograph as set forth in claim 26 further comprising a reciprocating shutter.

28. A spectrograph as set forth in claim 27 wherein the high-speed electromechanical-shutter further includes a control means and phase sensors and wherein the blade means includes phase slots having a position which is monitored by the phase sensors and the phase locked loop control is accomplished by the control of the motors by the electronic control means upon receiving information from the phase sensors.

29. A spectrograph as set forth in claim 28 wherein the high-speed electro-mechanical shutter is capable of being phase-locked to an external reference frequency, $f_2$ provided by external means.

* * * * *